United States Patent
Oka et al.

(10) Patent No.: US 12,302,777 B2
(45) Date of Patent: May 20, 2025

(54) SEED GERMINATION PROMOTING LIQUID AND SEED GERMINATION PROMOTING METHOD USING THE SAME

(71) Applicants: UNIVERSITY OF HYOGO, Hyogo (JP); KABUSHIKI KAISHA DAINICHI SEISAKUSHO, Hyogo (JP)

(72) Inventors: Yoshihiro Oka, Hyogo (JP); Tomohiro Hashimoto, Hyogo (JP)

(73) Assignees: UNIVERSITY OF HYOGO, Hyogo (JP); KABUSHIKI KAISHA DAINICHI SEISAKUSHO, Hyogo (JP)

(*) Notice: Subject to any disclaimer, the term of this patent is extended or adjusted under 35 U.S.C. 154(b) by 184 days.

(21) Appl. No.: 17/999,949

(22) PCT Filed: Dec. 1, 2021

(86) PCT No.: PCT/JP2021/044039
§ 371 (c)(1),
(2) Date: Nov. 28, 2022

(87) PCT Pub. No.: WO2022/130975
PCT Pub. Date: Jun. 23, 2022

(65) Prior Publication Data
US 2023/0200289 A1    Jun. 29, 2023

(30) Foreign Application Priority Data
Dec. 18, 2020    (JP) ................ 2020-210528

(51) Int. Cl.
*A01C 1/06*    (2006.01)
*A01C 1/02*    (2006.01)
(Continued)

(52) U.S. Cl.
CPC .......... *A01C 1/06* (2013.01); *A01C 1/02* (2013.01); *A01N 59/00* (2013.01); *A01P 21/00* (2021.08)

(58) Field of Classification Search
CPC ...................................................... A01C 1/06
See application file for complete search history.

(56) References Cited

U.S. PATENT DOCUMENTS 10,494,274 B2    12/2019    Asami et al.
2003/0110527 A1    6/2003    Ogawa et al.
(Continued)

FOREIGN PATENT DOCUMENTS

| CA | 2758068 C | * | 5/2019 | ............... A01C 1/06 |
| CN | 1063396 A | * | 8/1992 | ............... A01C 1/06 |

(Continued)

OTHER PUBLICATIONS

PCT/JP2021/044039; PCT International Search Report and Written Opinion of the International Searching Authority dated Feb. 15, 2022 and its English translation.

*Primary Examiner* — Monica L Perry
(74) *Attorney, Agent, or Firm* — Renner, Otto, Boisselle & Sklar, LLP

(57) ABSTRACT

Provided is a seed germination promoting liquid and a seed germination promoting method using the same that can be widely used for applications of promoting seed germination without restrictions on approaches or targets to be applied, wherein water containing reactive oxygen species and a nanoparticle catalyst in a stationary state is used to lubricate seeds.

5 Claims, 17 Drawing Sheets

(51) Int. Cl.
*A01N 59/00* (2006.01)
*A01P 21/00* (2006.01)

(56) References Cited

U.S. PATENT DOCUMENTS

| | | | |
|---|---|---|---|
| 2009/0099023 A1 | | 4/2009 | Ogawa et al. |
| 2012/0238448 A1 | | 9/2012 | Schneider et al. |
| 2018/0228174 A1 | * | 8/2018 | Feil .......................... A01C 1/06 |
| 2019/0380339 A1 | | 12/2019 | De Mesmaeker et al. |

FOREIGN PATENT DOCUMENTS

| | | | | |
|---|---|---|---|---|
| JP | 3103125 A | | 4/1991 | |
| JP | 2011041914 A | | 3/2011 | |
| JP | 2012135226 A | | 7/2012 | |
| JP | 2015003297 A | | 1/2015 | |
| JP | 202063382 A | | 4/2020 | |
| WO | WO-2014210372 A1 | * | 12/2014 | ............... A01C 1/00 |
| WO | WO-2020214843 A1 | * | 10/2020 | ............... A01C 1/06 |

* cited by examiner

SEED GERMINATION PROMOTING LIQUID AND SEED GERMINATION PROMOTING METHOD USING THE SAME

CROSS-REFERENCE TO RELATED APPLICATIONS

This application is a national phase of International Application No. PCT/JP2021/044039 filed 1 Dec. 2021, which claims priority to Japan Application No. 2020-210528 filed 18 Dec. 2020, the entire disclosures of which are hereby incorporated by reference.

TECHNICAL FIELD

The present invention relates to a seed germination promoting liquid and a seed germination promoting method using the same.

BACKGROUND ART

Conventionally, there have been proposed methods of treating seeds with various chemicals or applying a physical process to seeds in order to promote seed germination (see, for example, Patent Documents 1 and 2).

CITATION LIST

Patent Literature

Patent Document 1: Japanese Translation of PCT International Application Publication No. 2020-506952
Patent Document 2: Japanese Unexamined Patent Application Publication No. 2012-135226
Patent Document 3: Japanese Unexamined Patent Application Publication No. 2011-41914
Patent Document 4: Japanese Unexamined Patent Application Publication No. 2015-3297
Patent Document 5: Japanese Unexamined Patent Application Publication No. 2017-176201

SUMMARY OF INVENTION

Technical Problem

A germination promoter described in the above Patent Document 1 uses a specific compound, and a germination promoting method described in Patent Document 2 involves grinding the surface of seeds. For this reason, these technologies have problems of imposing restrictions on approaches or targets to be applied.

In view of the problems encountered with the conventional germination promoters and germination promoting methods for promoting germination of seeds as described above, it is an object of the present invention to provide a seed germination promoting liquid and a seed germination promoting method using the same that can be widely used for applications of promoting seed germination without restrictions on approaches or targets to be applied.

Solution to Problem

In order to achieve the above object, a seed germination promoting liquid according to the present invention is characterized by comprising water containing reactive oxygen species and a nanoparticle catalyst (including secondary particles formed by agglomeration of nanoparticles, hereinafter the same being applied to the present specification) in a stationary state.

A seed germination promoting method using the above seed germination promoting liquid according to the present invention is characterized by lubricating a seed using water containing reactive oxygen species and a nanoparticle catalyst in a stationary state.

Here, the methods of lubricating seeds include a method of immersing seeds in water containing reactive oxygen species and a nanoparticle catalyst in a stationary state, and a method of spraying or dispersing, on seeds, water containing reactive oxygen species and a nanoparticle catalyst in a stationary state.

In this case, the water containing the reactive oxygen species and the nanoparticle catalyst in the stationary state is preferably used in an environment where the water is not in contact with organic matter (excluding seeds).

To this end, the following are specifically recommended.

Purified water such as ion-exchanged water is used as water as the raw material for producing water containing reactive oxygen species and a nanoparticle catalyst in a stationary state.

Equipment and tools that are used to produce or store water containing reactive oxygen species and a nanoparticle catalyst in a stationary state or used in a cultivation process are made of non-organic material, such as glass or metal, and they are used with no residual organic matter after being cleaned in some manner, for example, by being cleaned with a neutral detergent and then rinsed with ion-exchanged water a plurality of times, or by being cleaned with a sodium hypochlorite solution and then rinsed with ion-exchanged water a plurality of times.

This can suppress the elimination of the reactive oxygen species due to the organic matter and can prevent the reactive oxygen species from losing its effect of promoting seed germination.

Advantageous Effect of Invention

According to the seed germination promoting liquid and seed germination promoting method using the same of the present invention, the processing of water as the raw material can produce the reactive oxygen species, which are components contained in the seed germination promoting liquid and thought to exhibit the effect of promoting seed germination. Thereafter, the reactive oxygen species can be finally transformed to the original water. Therefore, the seed germination promoting liquid and method are very reliable and safe and can be widely used for applications of promoting seed germination without restrictions on approaches or targets to be applied.

DESCRIPTION OF EMBODIMENTS

Hereinafter, embodiments of a seed germination promoting liquid and a seed germination promoting method using the same of the present invention will be described.

The seed germination promoting liquid of the present invention includes water containing reactive oxygen species and a nanoparticle catalyst in a stationary state. This seed germination promoting liquid can be produced by causing cavitation in water having a conductivity of 2000 μS/cm or less while causing the water to flow, and generating plasma by a plasma generation mechanism in which a pulse voltage is applied across electrodes in the water including air bubbles mainly containing water vapor generated by the cavitation.

A device for producing the seed germination promoting liquid can be a conventionally known device, that is, a mechanism of causing cavitation in water and generating plasma using a plasma generation mechanism in which a pulse voltage is applied across electrodes in the water including air bubbles mainly containing water vapor generated by the cavitation. More specifically, such a device for producing the seed germination promoting liquid can be a device obtained by combining a cavitation generation mechanism for causing cavitation in water through changing of the flow-passage cross-sectional area with a nozzle, an obstacle, etc., and the plasma generation mechanism as described in Patent Documents 3 and 4 of the above citation list, a device obtained by combining a cavitation generation mechanism for causing cavitation in water by rotating a rotor and the plasma generation mechanism with each other as described in Patent Document 5, or the like.

Here, an example is described which uses the device obtained by combining the cavitation generation mechanism that causes cavitation in water by rotating the rotor and the plasma generation mechanism with each other as a device for producing the seed germination promoting liquid.

Figure 1:
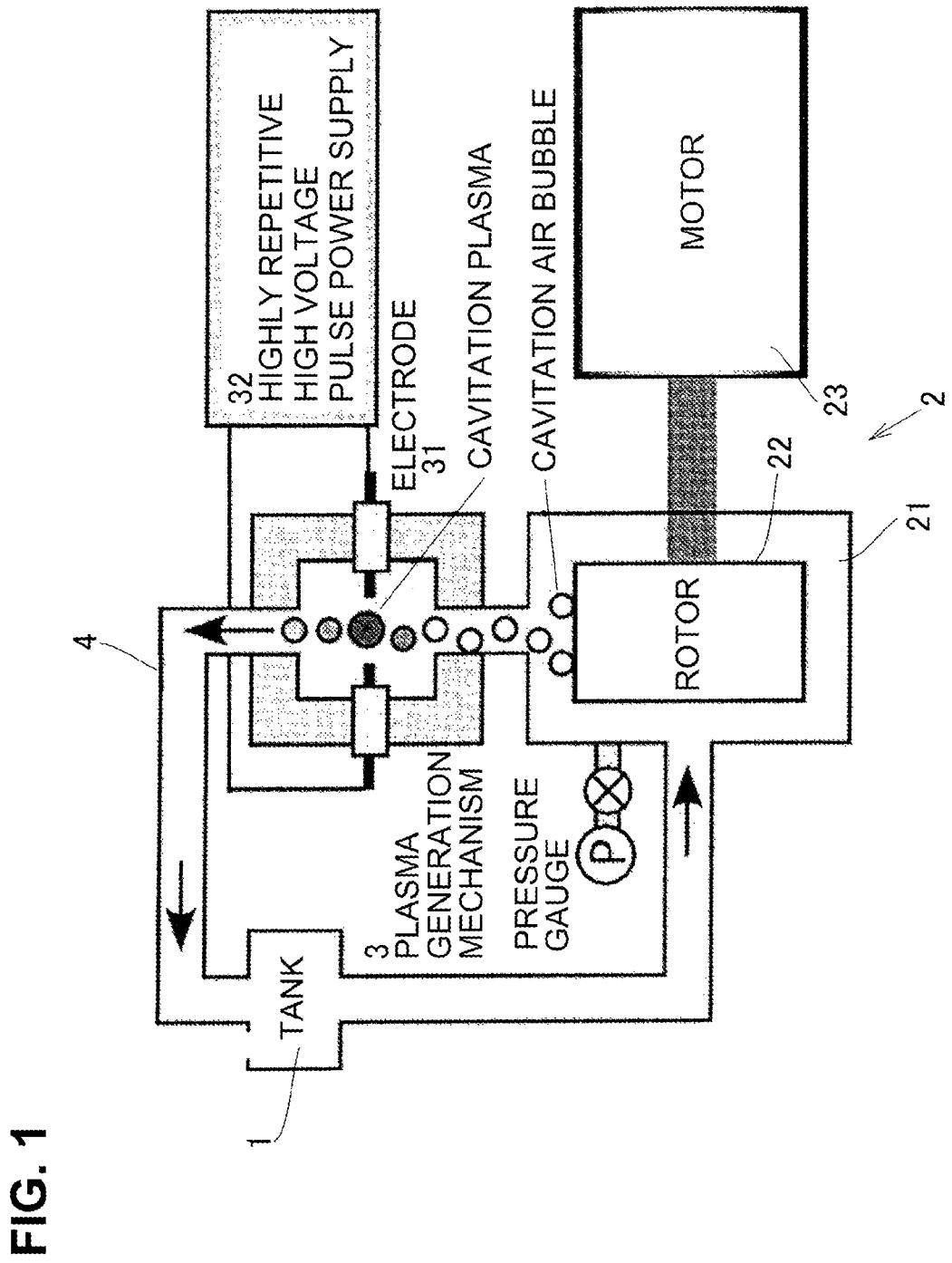
FIG. 1 is a conceptual diagram showing an example of a device for producing a germination promoting liquid, which is applied to produce a seed germination promoting liquid of the present invention.

This device for producing the seed germination promoting liquid is configured to include a tank 1 that stores water therein, a stirrer 2 as a cavitation generation mechanism that stirs the water supplied from the tank 1, a plasma generation mechanism 3 that generates plasma in the water including air bubbles (cavitation bubbles) mainly containing water vapor generated by the cavitation that has been caused by the stirrer 2, and a conduit line 4 that connects these mechanisms and causes the water to circulate, as shown in FIG. 1.

Here, causing the water to circulate is not essential. A configuration for one-path processing may be used as long as processing efficiency is enhanced, for example, by providing a plurality of plasma generation mechanisms and/or installing a plurality of pairs of electrodes.

The stirrer 2 is configured to include a rotor 22 that is provided in a casing 21 to be rotatable and is concentric with the casing 21, a motor 23 that drives the rotor 22 to rotate, and the like.

The plasma generation mechanism 3 is configured to include electrodes 31 formed by a conductor, a pulse power supply 32 that applies, for example, a voltage equal to or higher than a discharge inception voltage and a pulse voltage with a pulse width of 1.5 μs or less and a repetition frequency of 100 kHz or more across the electrodes 31, and the like. By the plasma generation mechanism 3, vapor is ionized (changed to plasma) through high voltage breakdown discharge caused by the pulse voltage in an insulating air-bubble region, whereby in-liquid plasma (cavitation plasma, which may be referred to as "CBP (Cavitation bubble plasma)" in the present specification) is generated.

The form of discharge caused by the pulse voltage is preferably glow discharge. The glow discharge can synthesize a nanoparticle catalyst in the crystal form, the quasicrystal form, the amorphous form, and the like at low temperature in an energy-efficient manner; the nanoparticle catalyst is made of, for example, an inorganic compound such as a metal or metal oxide arising from a wear component of the electrode 31, or a sulfide or chloride arising from impurities contained in the water produced by the in-liquid plasma. That is, the nanoparticle catalyst is composed of nanoparticles made of a component of the electrode 31. In the case where the electrodes are made of metal, the nanoparticles are metal nanoparticles at the moment when being generated. Depending on the type of the metal, the nanoparticles are oxidized, or when chlorine or sulfur is contained in the water, the nanoparticles are chlorinated or sulfurized (the nanoparticles may be turned into a compound with a substance contained in impurities).

Here, the flow rate of water near the electrodes 31 in the plasma generation mechanism 3 is about 10 m/s and desirably 5 m/s or more.

The electrodes 31 are preferably disposed to be opposed to each other in the direction perpendicular to the flow of water. However, other arrangements including the inverted V-shape arrangement can be employed as long as plasma can be produced.

As the material for the electrodes 31, any of the following conductor materials can be selected depending on the usage. Examples of the conductor materials include: metals such as tungsten, copper, iron, silver, gold, platinum, aluminum, scandium, titanium, vanadium, chromium, manganese, cobalt, nickel, zinc, gallium, germanium, yttrium, zirconium, molybdenum, technetium, ruthenium, rhodium, palladium, cadmium, indium, tin, antimony, lanthanoid, hafnium, tantalum, rhenium, osmium, iridium, thallium, bismuth, and polonium; carbon; conductive diamond; alloys of these materials; composite materials of these materials (including a member covered with a thin film formed by plating, dry coating, or the like); and oxides (including a resultant material obtained by a reaction of the surface of the electrodes 31 with water). The electrodes 31 disposed to be opposed to each other can differ in the material to be used and/or the size. For example, the electrodes 31 are made of gold and silver, respectively.

The electrodes 31 may have a shape of a cylinder, a prism, an elliptical cylinder, a cone, or a pyramid. Although one pair of electrodes 31 is enough, two or more pairs of electrodes 31 may be provided in order to enhance processing efficiency more. Regarding the plasma generation mechanism, one set is enough. However, two or more sets may be provided in order to enhance the processing efficiency more.

One of the electrodes 31 may be grounded or not grounded. The configuration in which one of the electrodes 31 is not grounded is safer because a discharge path is limited between the electrodes.

Further, water can be processed at a temperature of 50° C. or lower by operating a cooler provided in the device for producing the seed germination promoting liquid, for example, a jacket cooling unit (not shown) provided in the stirrer 2, as necessary.

In the water thus produced by the in-liquid plasma, hydrogen peroxide or the like as reactive oxygen species is stably present, in addition to the nanoparticle catalyst, even in a stationary state where the operation of the device for producing the seed germination promoting liquid is stopped. Therefore, this water can be used as the seed germination promoting liquid because of the effect of hydrogen peroxide.

This seed germination promoting liquid continuously produces reactive oxygen species, for example, hydroxyl radicals (OH) that have the highest oxidizability among the reactive oxygen species due to a sterilizing action by long-lived reactive oxygen species (superoxide anion radicals ($\cdot O_2-$), hydroperoxy radicals (HOO·), and hydrogen peroxide ($H_2O_2$)) present in the seed germination promoting liquid and a catalyst action of the nanoparticle catalyst present in the seed germination promoting liquid in which hydrogen peroxide ($H_2O_2$) is present, whereby the effect of hydrogen peroxide ($H_2O_2$) is further enhanced, and the effect of promoting seed germination lasts a long time.

Therefore, regarding the seed germination promoting liquid, the amounts of hydrogen peroxide and the nanoparticle catalyst that are present in the seed germination promoting liquid are important. According to the present invention, a large amount of seed germination promoting liquid can be produced only from water as a raw material in a simple, fast, and simultaneous manner.

Figure 2:
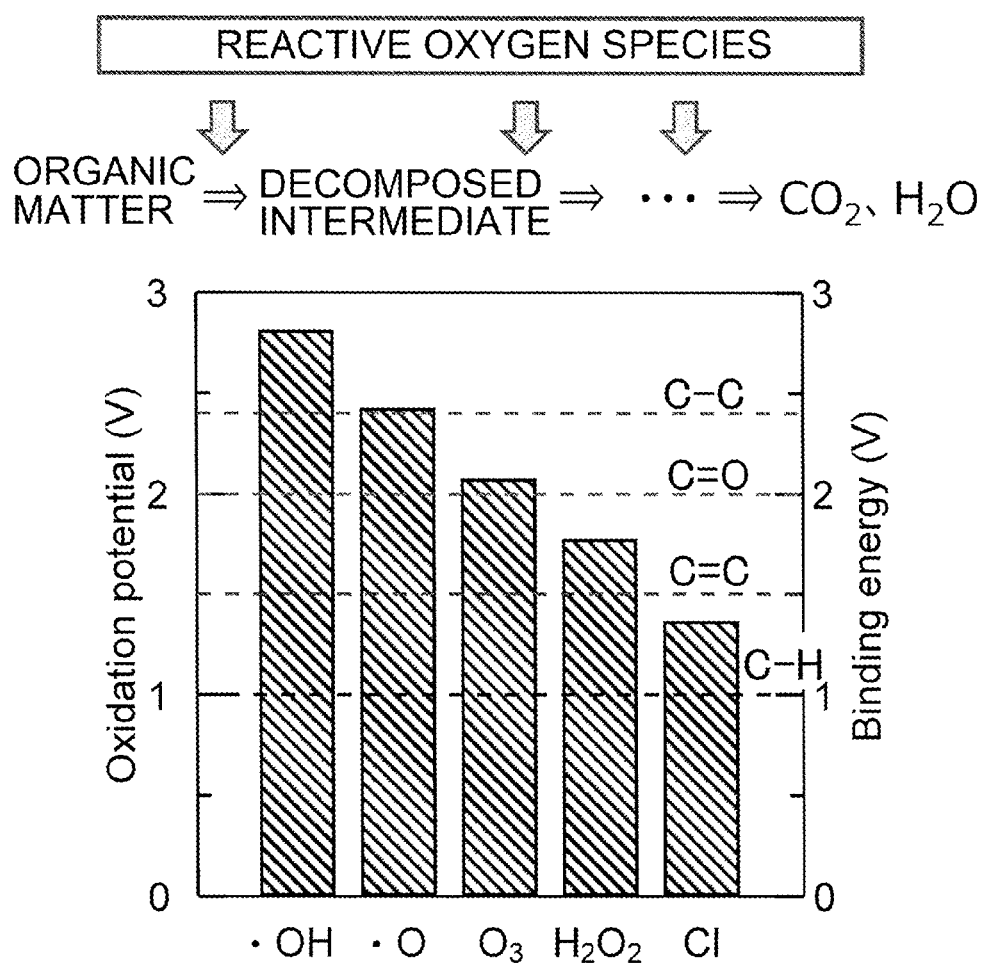
FIG. 2 shows oxidation potentials and binding energies of various materials including reactive oxygen species.

FIG. 2 shows oxidation potentials and binding energies of various materials including reactive oxygen species.

As is apparent from FIG. 2, the reactive oxygen species such as hydroxyl radicals (OH) have a strong action of decomposing (sterilizing) organic matter (including microorganisms (viruses, bacteria, fungi, and protozoa) and the like) in addition to the effect of promoting seed germination and thus can also be expected to exert an effect of disinfecting seeds.

EXAMPLES

Next, a description will be given of a test that was conducted by using a device for producing a seed germination promoting liquid (specifically, a "cavitation plasma device" manufactured by Nihon Spindle Manufacturing Co., Ltd.).

[Processing Conditions for the Device that Produces Seed Germination Promoting Liquid]

Figure 3:
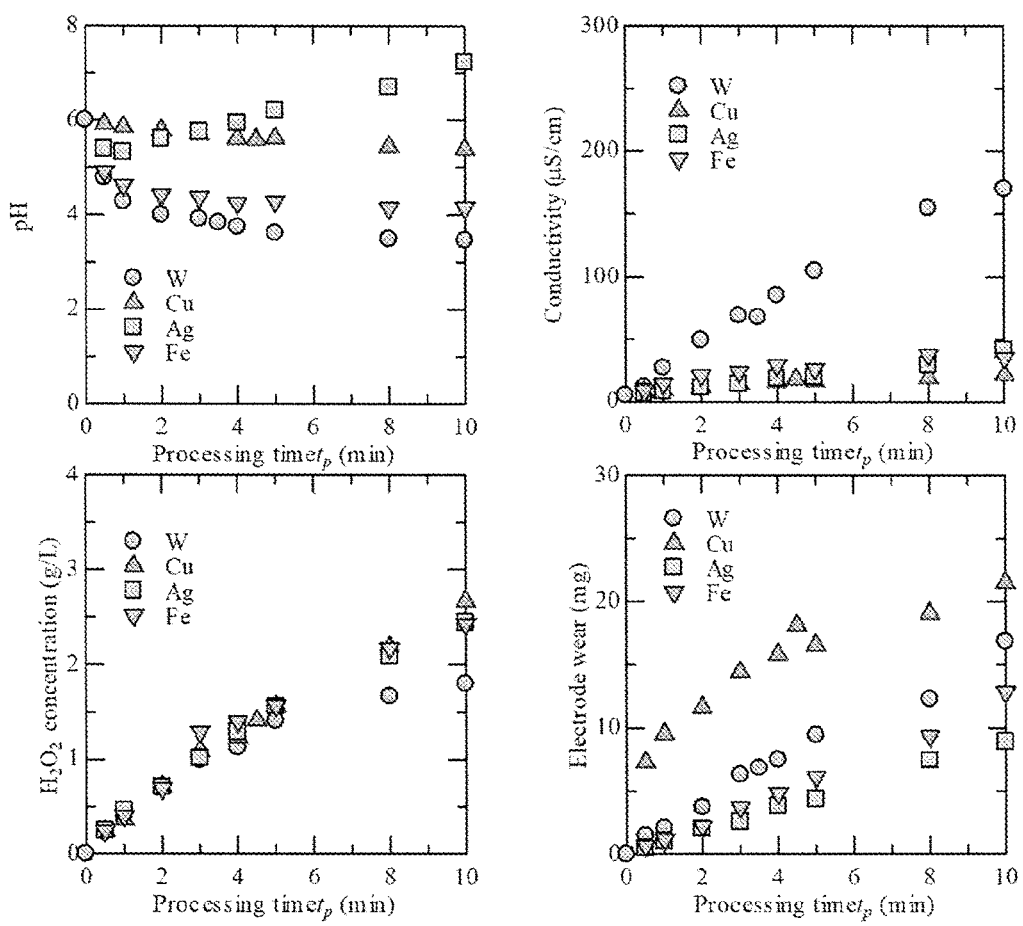
FIG. 3 shows the relationship between the processing time for each electrode material and the pH, conductivity, concentration of hydrogen peroxide, and electrode wear.

Table 1 shows the processing conditions (preferable ranges) for the device that produces the seed germination promoting liquid, and FIG. 3 shows the relationship between the processing time for each electrode material and the pH, conductivity, concentration of hydrogen peroxide, and electrode wear.

TABLE 1

| Preferable ranges of CBP Processing Conditions | | |
|---|---|---|
| Solution | Type | ION-EXCHANGED WATER |
| | Mass | 250 g |
| | Initial pH (neutrality is better) | 5-9 |
| | Initial Conductivity (lower level is better) | 0.01-2000 µS/cm |
| | Initial Water Temperature | 15-30 ° C. |
| | Initial COD (Lower level is better) | 0.01-2000 ppm |
| Stirrer | Number of revolutions (higher level is better) | 2400-10800 rpm |
| Power Source | Applied Voltage (about 10 kV is better) | ±1-20 kV |
| | Pulse Width (about 1.0 us is better) | 0.5-2.0 µs |
| | Repetition Frequency (higher level is better) | 0.1-500 kHz |
| Electrode | Material (conductor stable in water) | W, Ag, Cu, Fe, Alloy . . . |
| | Diameter (about 2 mm is better) | 0.2-10 mm |
| | Gap Length (1-2 mm is better) | 0.2-10 mm |
| | Processing Time $t_p$ (5 min is better) | 0.1-60 min |

As for Table 1 and FIG. 3, the following can be said.

As an initial conductivity is lower, a plasma production rate (a ratio of the number of pulses produced by plasma to the number of applied pulses) is higher, and therefore the seed germination promoting liquid can be efficiently produced. Here, "initial" means "before plasma processing". This is the same as to other items.

Higher initial COD is not preferable because produced reactive oxygen species are consumed.

Other contaminants have no effect as long as the initial conductivity, the initial PH value, and the initial COD are within preferable ranges, respectively. Therefore, it is preferable to use purified water such as ion-exchanged water (hereinafter sometimes referred to as "DIW") as water that is a raw material of processing. However, the raw material is not limited thereto.

As the number of revolutions of a stirrer becomes larger, cavitation bubbles increase. Therefore, the plasma production rate becomes higher, so that the seed germination promoting liquid can be efficiently produced.

When an applied voltage is excessively low, plasma is not lit up. When the applied voltage is high, the plasma production rate becomes high. However, an excessively high applied voltage is not preferable because transition from glow discharge, which is preferable, to arc discharge occurs.

Plasma is not lit up when the pulse width is excessively short, whereas the plasma production rate becomes high when the pulse width is long. However, an excessively long pulse width is not preferable because transition to arc discharge occurs.

As a repetition frequency is higher, the plasma production rate is higher, and plasma can be produced more stably.

A pulse voltage may be bipolar or have a positive polarity or a negative polarity.

It suffices that the electrode material is any conductor that is stable in water. The electrode material may be a metal, an alloy, or carbon.

Since a nanoparticle catalyst such as an electrode component is mixed as impurities in the seed germination promoting liquid, the electrode material needs to be selected depending on usage.

When the electrode diameter is excessively thin, concentration of an electric field occurs, and plasma can be lit up easily. However, transition to arc discharge can occur easily. When the electrode diameter is excessively thick, plasma is less likely to be lit up.

When the gap length between the electrodes is excessively short, transition to arc discharge can easily occur. When this gap length is excessively long, plasma is less likely to be lit up.

When the processing time is excessively short, the produced amounts of reactive oxygen species and nanoparticle catalyst are reduced. When the processing time is excessively long, the reactive oxygen species and nanoparticle catalyst that are produced make the conductivity higher, resulting in lower plasma generation rate. The processing time is normally about 2 to 10 minutes, preferably about 3 to 8 minutes, and more preferably about 5 minutes. Here, the device for producing the seed germination promoting liquid is set in such a manner that, when the number of revolutions of the stirrer is 7200 rpm, 250 mL of water circulates in the device once per second.

Figure 4:
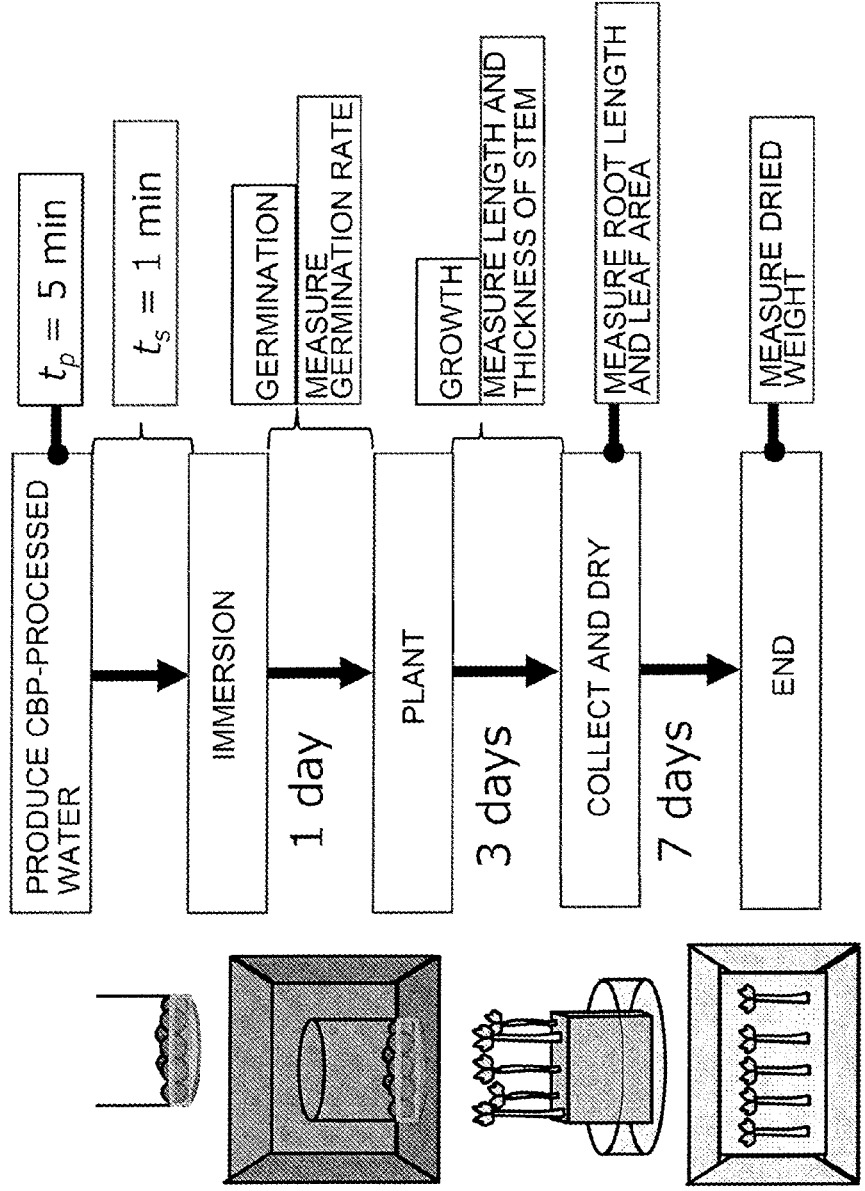
FIG. 4 is a flow diagram showing the procedure of a seed germination test and a growth test.
Figure 5:
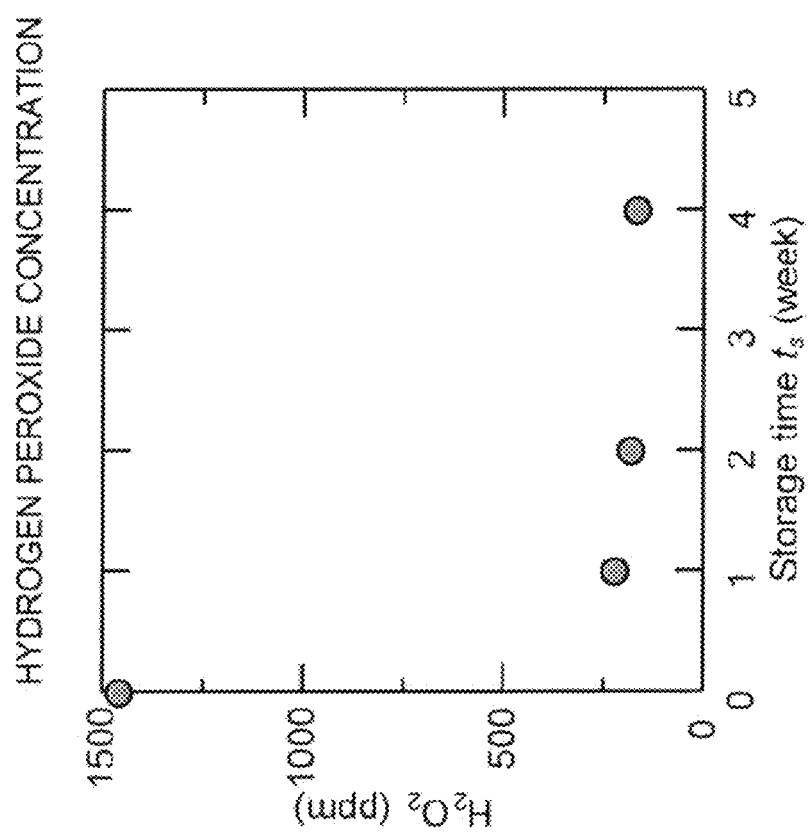
FIG. 5 shows changes in the concentration of hydrogen peroxide (the relationship between the concentration of hydrogen peroxide and the elapsed time after the production of CBP-processed water).

[Seed Germination Test (1)](See Tables 2 to 4 and FIGS. 4 and 5)

Next, a germination test was conducted using seeds of radish sprouts as a model by the following test method.

(1) Seeds and Pre-Processing (the Same being Applied to Seed Germination Tests (2) and (3) to be Mentioned Later)

Seeds of radish sprouts to be used were sterilized when they were contaminated with bacteria because the bacteria may affect their germination and growth. The sterilization of the seeds was conducted according to a manual of Forest Tree Breeding Center. Seeds of radish sprouts (Nakahara Seed Farm, germination rate of 85%) were used as test plants. One hundred seeds were immersed and sterilized in 100 mL of 1.0% sodium hypochlorite solution for 5 minutes and cleaned with ion-exchanged water five times. Subsequently, these seeds were dried at 40° C. for 17 hours in a dry chamber (DKM300, Yamato). Beakers, petri dishes, etc., to be used in the experiment were cleaned with tap water and immersed in 200 ppm sodium hypochlorite solution for 15 minutes in order to use them with no residual organic matter. Subsequently, those tools were immersed in tap water for 2 minutes, then in a 20 ppm sodium thiosulfate solution for 2 minutes, and dried at 40° C. in the dried chamber (DKM300, Yamato). The residual chlorine on the seeds or tools was confirmed to be less than 0.1 ppm by using a pack test (WAK-CIO·DP, Kyoritsu Chemica-Cheak Lab) after the sterilization test.

(2) Germination Conditions

The seeds were immersed in a germination solution (water) by about half their height for one day so that they were exposed to air, and their germination rates were measured at that time.

(3) Operation of the Device for Producing Seed Germination Promoting Liquid

Into the device for producing the seed germination promoting liquid, 260 mL of purified water (ion-exchanged water) was introduced. Then, under the processing conditions shown in Table 3, the producing device was operated for an operating time $t_p$=5 minutes to produce a sample water. The sample water was collected in a sterile container made of synthetic resin and allowed to stand for a predetermined time $t_s$. After the sample water stood for the predetermined time (elapsed time $t_s$=1 min to 4 weeks until the seeds were immersed), 4 mL of the sample water was collected in a glass beaker (φ2 mm, height 50 mm), and the seeds were immersed in the sample water.

As a reference, 4 ml of purified water (ion-exchanged water) was collected in a glass beaker, and the seeds were immersed in it.

TABLE 2

Germination Conditions

| Nursery | Container | Beaker | |
|---|---|---|---|
| | Size | φ42 mm × 50 mm | |
| | Material | Glass | |
| Environment | Temperature | 25 ± 2° C. | |
| | Humidituy | 30 ± 5% | |
| Water supply method | Type | Deionized water (DIW) | CBP-processed water (CBPTW) |
| | Storage time $t_s$ | — | 1 min |
| | Amount | 4 mL | |
| Sample | Number of pieces | 20 pieces × 5 times (100 pieces) | |

TABLE 3

CBP-Processed Water Producing Conditions

| Solution | Type | Deionized water |
|---|---|---|
| | Mass | 260 g |
| | Initial pH | 6 |
| | Initial Conductivity | 2 µS/cm or less |
| | Initial Water Temperature | 30 ° C. |
| Dispersion Device | Number of revolutions | 7200 rpm |
| Power Supply | Applied voltage | 10 kV |
| | Pulse Width | 1.0 µs |
| | Repetition Frequency | 200 kHz |
| | Polarity | Bipolar |
| Electrode | Material | W |
| | Diameter | φ2.0 mm |
| | Gap length | 1.0 mm |
| | Processing time $t_p$ | 5 min |

TABLE 4

Water Quality Examination Results

|  | DIW | CBPTW |
|---|---|---|
| pH | 5.6 | 4 |
| Conductivity (μS/cm) | 1.9 | 91 |
| Hydrogen Peroxide Concentration (ppm) | <1 | 1455 |

Figure 6:
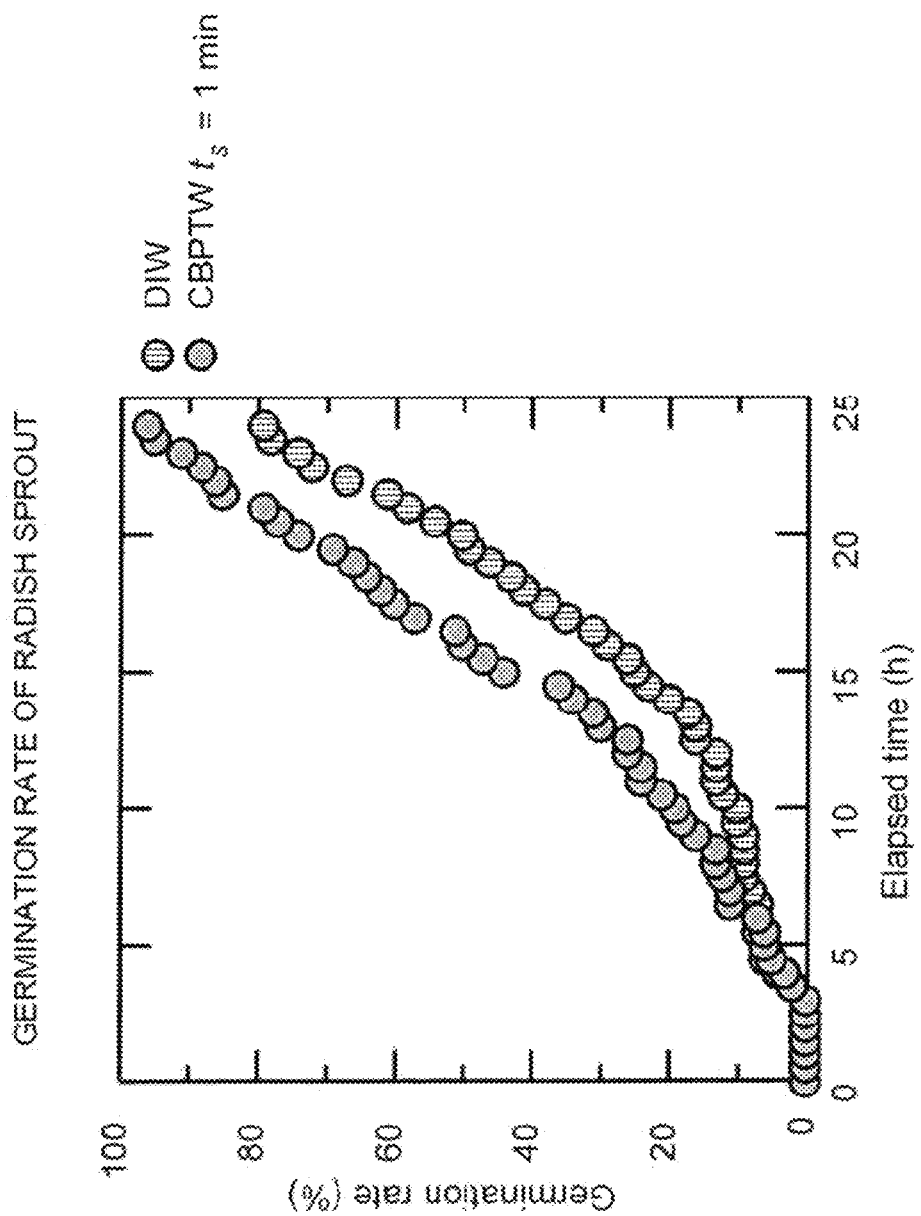
FIG. 6 shows the germination rate (the relationship between the elapsed time and the germination rate).
Figure 7:
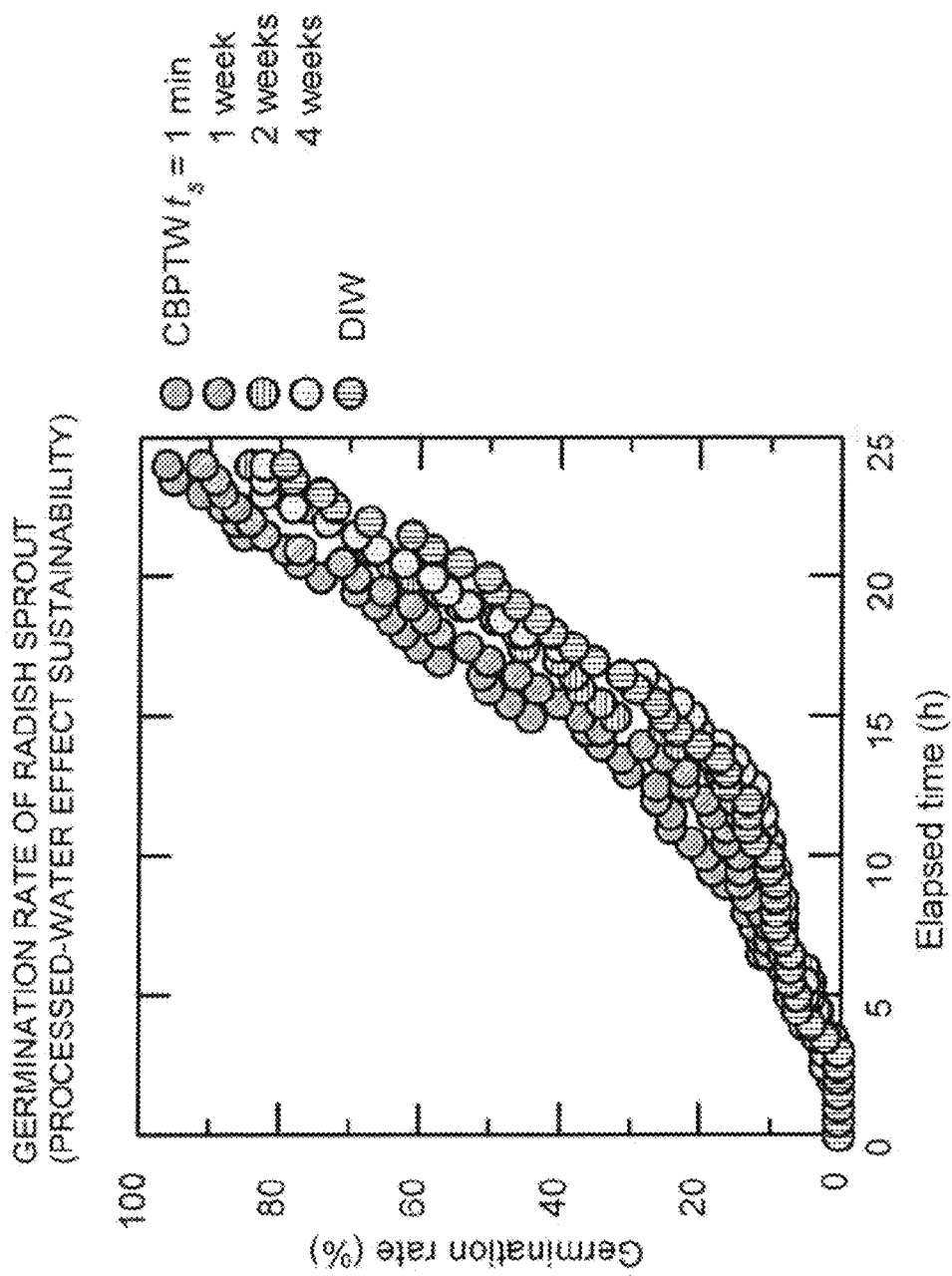
FIG. 7 shows the germination rate (the relationship between the elapsed time and the germination rate).

The results of the seed germination test (the relationship between the germination rate and each of the CBP treated water and the elapsed time after the CBP treatment) shown in FIGS. 6 and 7 revealed the following:

The CBP-processed water (CBPTW) increased the germination rate (germination promoting rate) by up to 20%, compared to purified water (ion-exchanged water) (DIW).

The longer the time $t_s$ during which the CBP-processed water to be used was left to stand (the elapsed time after the production of the CBP-processed water), the lower the germination rate (germination promoting rate), which eliminates the effect of the CBP-processed water. As can be seen from the test results shown in FIG. 7, the CBP processed water is desired to be used earlier (as soon as possible) because its effect was almost lost in four weeks.

From this fact, it can be presumed that the amount of active oxygen species contained in water affects the germination rate (germination promoting rate). In other words, the longer the time during which the CBP-processed water is left to stand, the less the amount of active oxygen species becomes.

Figure 8:
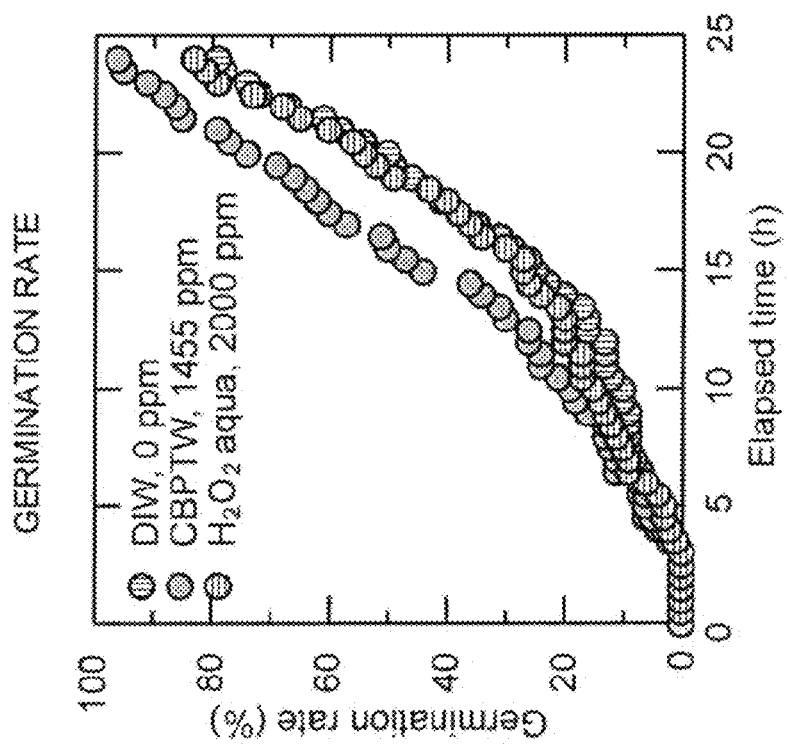
FIG. 8 shows the germination rate (the relationship between the elapsed time and the germination rate).

This can also be confirmed from the results of comparison tests using purified water (ion-exchanged water) and hydrogen peroxide solution as the germination liquid (water) for immersion of the seeds as shown in FIG. 8.

Figure 9:
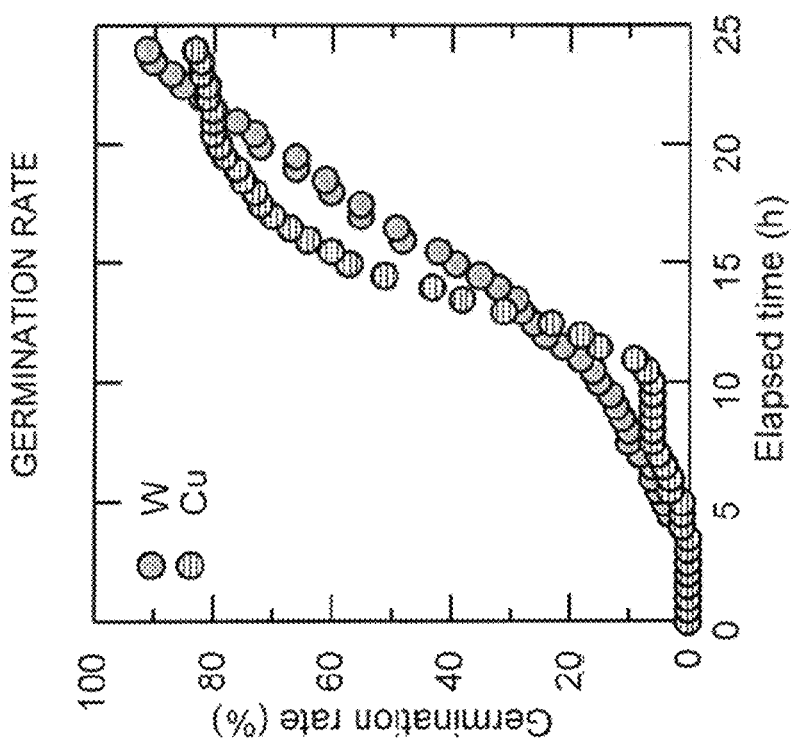
FIG. 9 shows the germination rate (the relationship between the elapsed time and the germination rate).

Furthermore, from a test that was conducted by changing the electrode material for use in the device for producing the seed germination promoting liquid, it is found, as shown in Table 5 and FIG. 9, that the electrode material to be used in the producing device slightly affects the germination rate (germination promoting rate).

TABLE 5

Water Quality Examination Result

| Electrode Material | W | Cu |
|---|---|---|
| pH | 4.0 | 5.7 |
| Conductivity (μS/cm) | 91 | 8.3 |
| Hydrogen Peroxide Concentration (ppm) | 1455 | 1560 |

[Growth Test] (See Table 6)

Next, the growth test was conducted according to the following procedure.

Seedlings germinated in the seed germination test were planted in a medium, and during that time, the length and thickness of the stems were measured. After three days, the seedlings were taken out, and the lengths of their roots and the areas of their leaves were measured. In addition, the seedlings were dried, and after seven days, their dried weights were measured.

Specifically, five holes, each having a diameter of 3 mm and a depth of 5 mm, were formed with an electric drill at equal intervals on a medium (30 mm×30 mm×30 mm) made of a rock wool (JAN130031, Yamato-plastic Co., Ltd); these holes were located at respective positions defined by dividing the diagonal line of the medium into four parts. Thereafter, four pieces of rock wool with the holes were placed in a glass petri dish and used as the medium. Subsequently, after the germination rate was measured for 24 hours, one seed was planted in each hole of the four pieces of rock wool placed in the petri dish. After the planting, 100 mL of ion-exchanged water was put in the petri dish to sufficiently supply the water to the rock wool pieces, followed by addition of the ion-exchanged water until its height reached 10 mm from the bottom of the petri dish, and the petri dish was left in a dark room. The growth was photographed every other day, and the ion-exchanged water was adjusted to be at a height of 10 mm from the bottom of the petri dish. To avoid the growth interference between the radish sprouts, from the third day onward, the radish sprouts were irradiated with LED light in a LED planter (greenteria, Deagostini) for 12 hours, causing their stems to extend vertically.

TABLE 6

Growth Conditions

| Container | Type | Petri Dish |
|---|---|---|
|  | Size | φ90 mm × 20 mm |
|  | Material | Glass |
| Nursery | Type | Rock Wool |
|  | Size | 3 cm × 3 cm × 3 cm |
| Environment | Temperature | 25 ± 2° C. |
|  | Humidity | 35 ± 5% |
| Water Supply Method | Type | Deionized Water (DIW) |
|  | Amount | 65 mL |
|  | Interval | 24 h |
| Number of Trials |  | 20 pieces × 5 times (100 pieces) |

Figure 10:
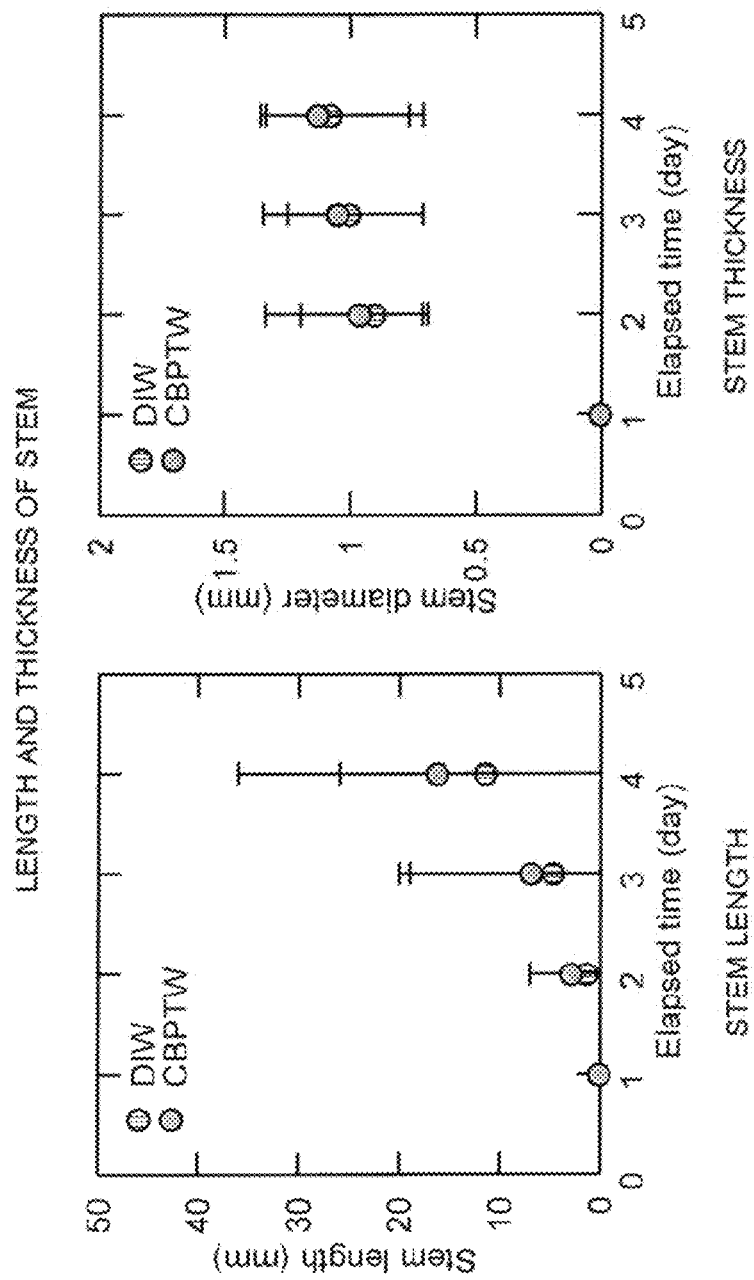
FIG. 10 shows the degree of growth of a seedling (the relationship between the elapsed time and the length and thickness of a stem).
Figure 11:
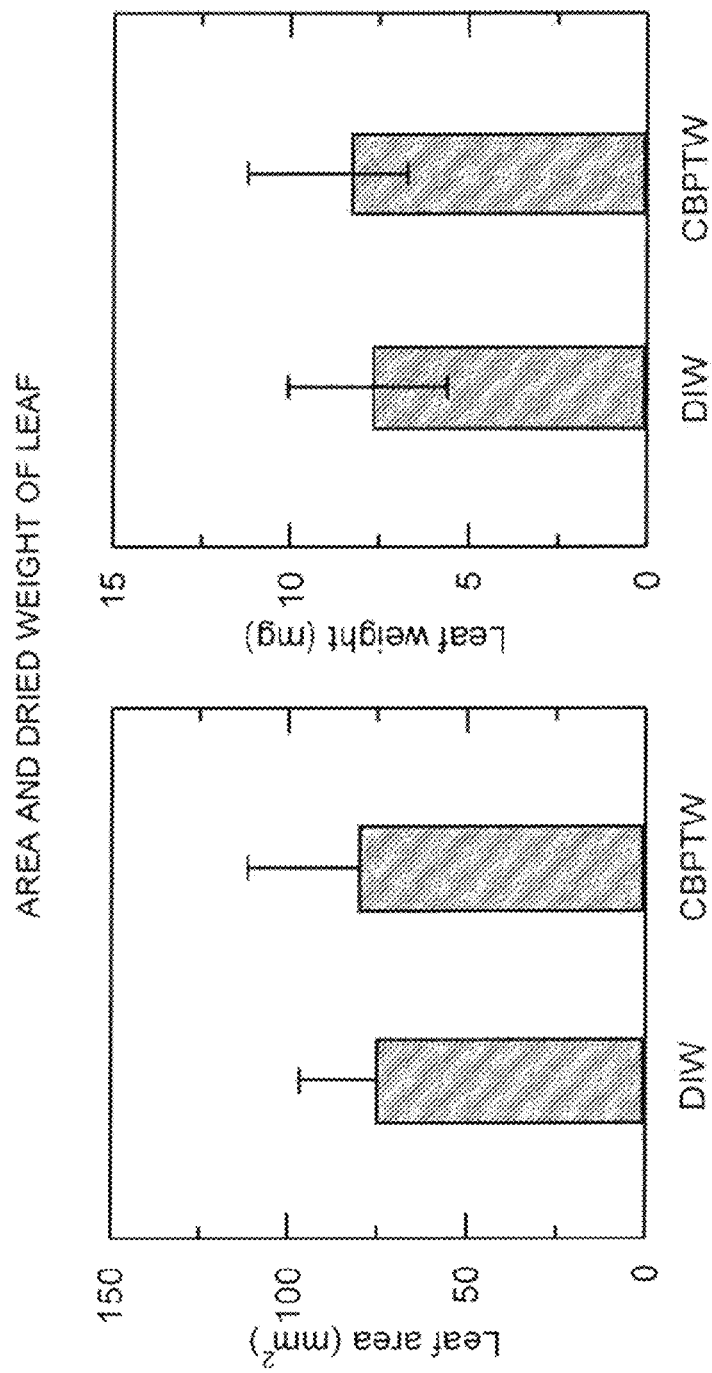
FIG. 11 shows the degree of growth of a seedling (the leaf area and its dried weight).
Figure 12:
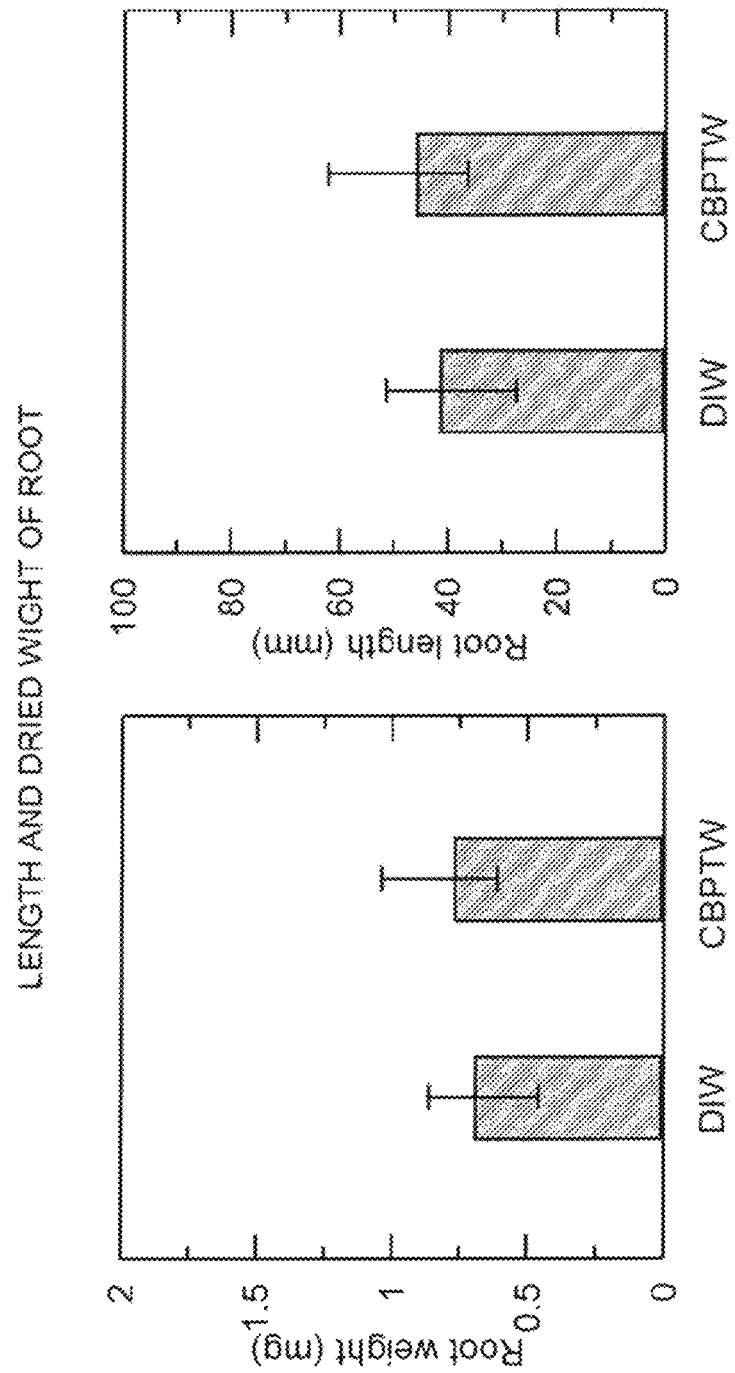
FIG. 12 shows the degree of growth of a seedling (the root length and its dried weight).

The results of the growth tests shown in FIGS. 10 to 12 revealed the following:

The CBP-processed water was confirmed to allow the seedlings to grow well also in the growth test while exhibiting a favorable result regarding the germination rate (germination promoting rate), compared to purified water (ion-exchanged water).

[Seed Germination Test (2)] (See Tables 2 to 4 and FIG. 4)

Next, a germination test was conducted under different germination test environments by the following test method.

Specifically, the germination test was conducted by two methods: (1) a method of spraying a solution on seeds; and (2) a method of immersing seeds in a solution.

(1) Method of Spraying Solution on Seeds (See Table 7)

Kitchen paper (Super Grid Emboss, Elleair) (22 cm×22.5 cm) was folded in half and its four corners were mountain-folded each by 4 cm to make the thickness of the kitchen paper uniform. Such folded paper was placed in a glass petri dish (00 mm, height 20 mm) and used as a nursery.

In the nursery, 20 seeds were arranged at equal intervals, five vertically and four horizontally.

Some seeds were sprayed with 6 mL of ion-exchanger water, while the other seeds were sprayed with 6 mL of the CBP-processed water (elapsed time is $t_s$=1 min) processed under the conditions of Table 3. The sprayed seeds were placed in the respective petri dishes and covered with lids. Note that the CBP-processed water after being produced was transferred from the producing device to a beaker and then placed in a spray bottle. Seeds of radish sprouts are dark-germinated seeds, and thus the nurseries were placed in a dark room at a temperature of 25(±2°) C. and a humidity of 30(±5)% for one day. The germination rates were measured under the respective conditions every 30 minutes using an Interval Shooting App (HD Camera Lite). The number of samples, i.e., seeds, was set to 20 per nursery. By providing five nurseries, a total of 100 seeds were prepared.

TABLE 7

Germination Conditions

| Nursery | Container | Petri Dish |
|---|---|---|
| | Size | φ90 mm × 20 mm |
| | Material | Glass |
| Environment | Temperature | 25 ± 2° C. |
| | Humidity | — |
| Water Supply Method | Type | Deionized Water (DIW)    CBP-Processed Water (CBPTW) |
| | Storage Time $t_s$ | 1 min |
| | Amount | 6 mL |
| Sample | Number of Pieces | 20 pieces × 5 Times (100 pieces) |

(2) Method of Immersing Seeds in Solution (the Same as the Seed Germination Test (1))

Twenty seeds placed in a glass beaker (φ42 mm, height 50 mm) were sprayed with 4 mL of ion-exchanger water, while another twenty seeds placed in a glass beaker were sprayed with 4 mL of the CBP-processed water (elapsed time $t_s$ until the immersion of the seeds=1 min to 4 weeks) processed under the conditions of Table 3. The germination rates of all these sprayed seeds were measured in the same way while the seeds were immersed in the respective solutions by about half their height so that the seeds were exposed to the air.

Figure 13:
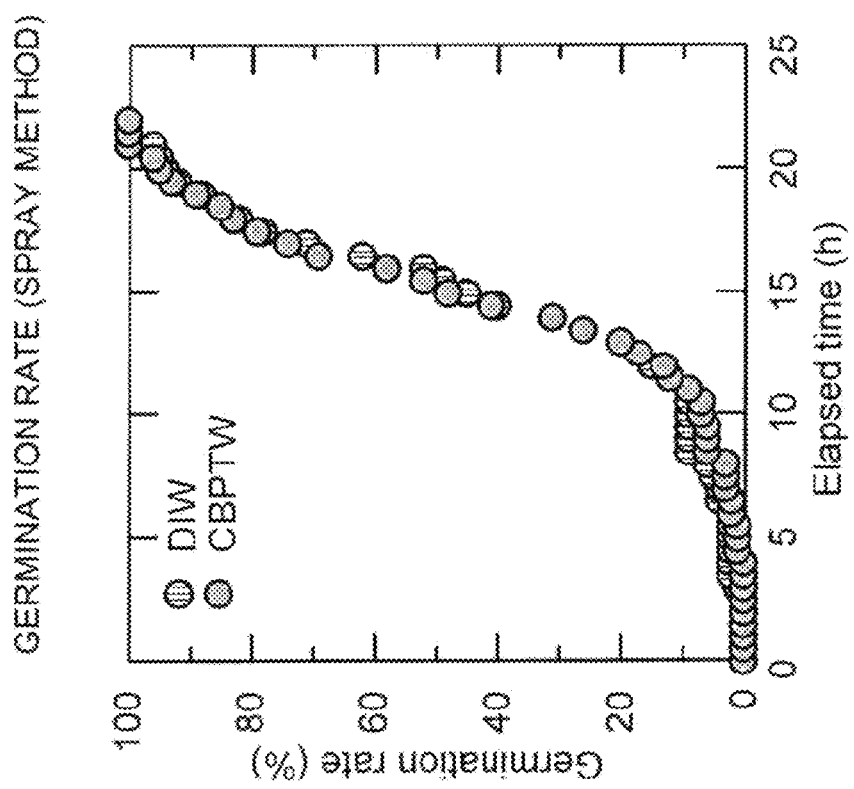
FIG. 13 shows the germination rate (the relationship between the elapsed time and the germination rate).
Figure 14:
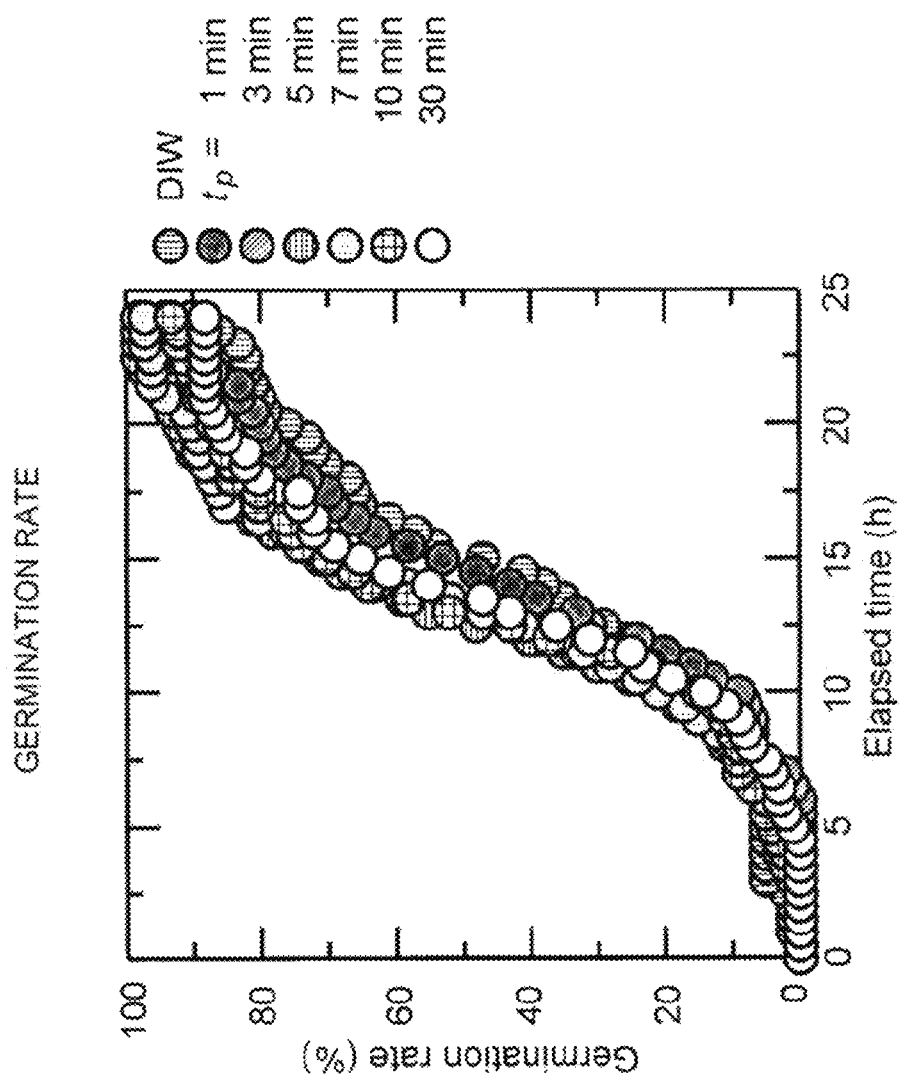
FIG. 14 shows the germination rate (the relationship between the processing time and the germination rate).
Figure 15:
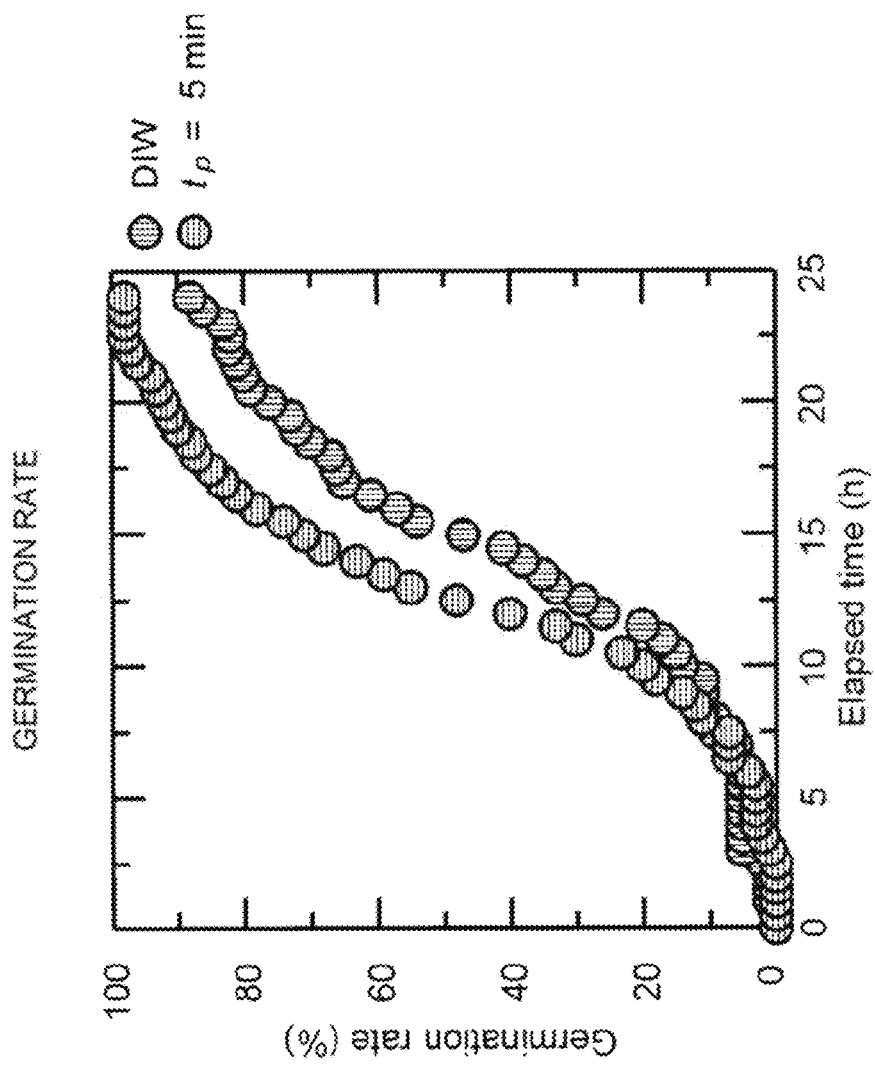
FIG. 15 shows the germination rate (the relationship between the processing time and the germination rate).
Figure 16:
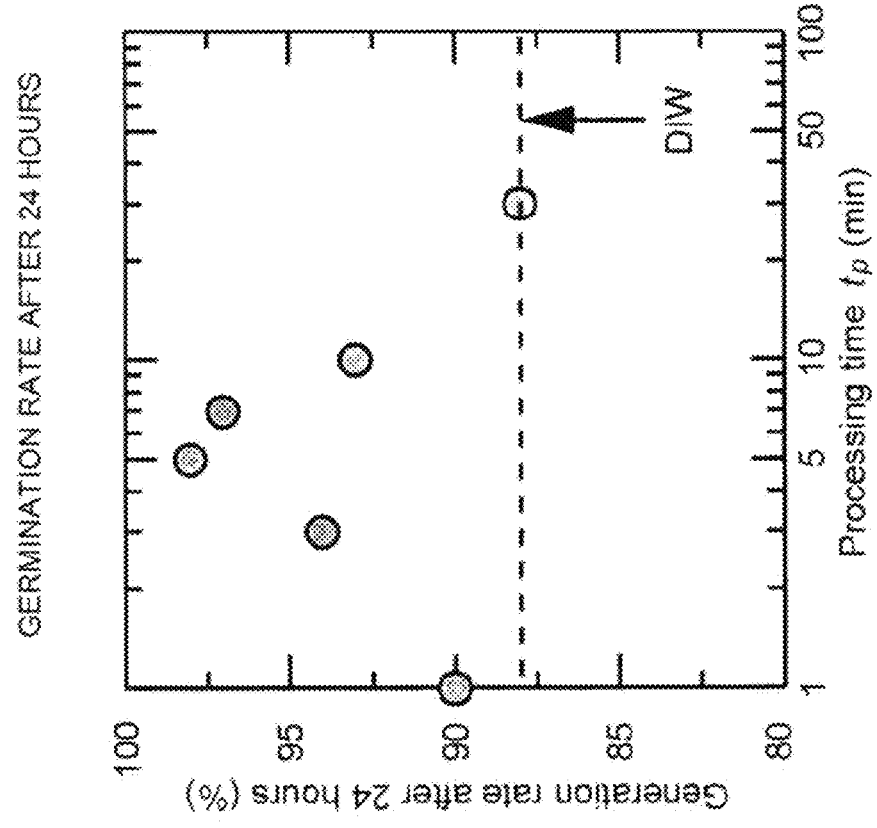
FIG. 16 shows the germination rate (the relationship between the processing time and the germination rate).
Figure 17:
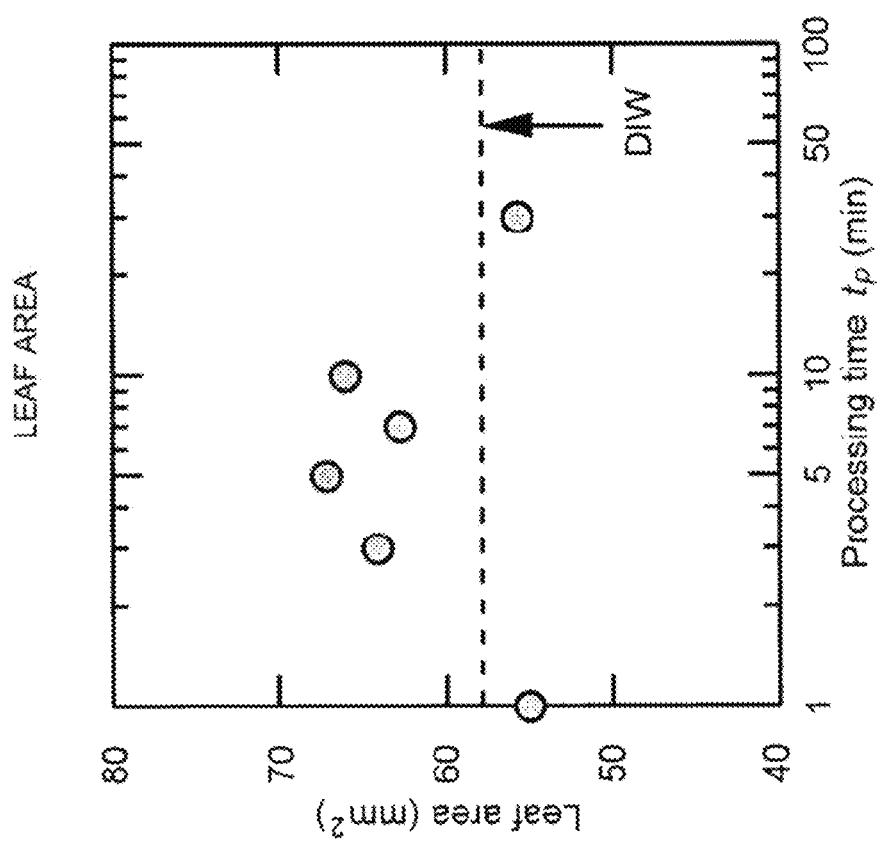
FIG. 17 shows the degree of growth of a seedling (the relationship between the processing time and the leaf area).

The results of the seed germination tests (the relationship between the CBP-processed water and the germination rate), shown in FIG. 13 ((1) the method of spraying the solution on seeds) and FIGS. 6 and 7 (the same as the method of immersing seeds in the solution), revealed the following:

Unlike the method (2) of immersing seeds in the solution, in the method (1) of spraying the solution on seeds after laying kitchen paper in the petri dish, it was confirmed that the CBP-processed water was not significantly advantageous over purified water (ion-exchanged water) and had no effect of promoting seed germination. This is thought to be because the kitchen paper contained organic matter (organic material itself+binding agent), and due to this organic matter, the CBP-processed water lost its own effect of promoting seed germination in an early stage. From this, it is found that in order for the CBP-processed water to exert its own effect of promoting seed germination, it is important to use the CBP-processed water in an environment free of organic matter. Specifically, it is important that equipment and tools, which come into contact with the CBP-processed water when used in the producing or storage process of the CBP-processed water or in a cultivation process, are made of non-organic material such as glass or metal, or that they are used with no residual organic matter by being cleaned with a cleaning solution such as a sodium hypochlorite solution.

[Seed Germination Test (3)] (see Tables 8 and 9 and FIGS. 14 to 17)

Next, a germination test was conducted using seeds of radish sprouts as a model by the following test method.

(1) Germination Conditions

The seeds were immersed in a germination solution (water) by about half their height for one day so that they were exposed to air, and their germination rates were measured at that time.

(2) Operation of Device for Producing Seed Germination Promoting Liquid

Into the device for producing the seed germination promoting liquid, 260 mL of purified water (ion-exchanged water) was introduced. Then, under the processing conditions shown in Table 9, the producing device was operated for an operating time $t_p$=1 to 30 minutes to produce a sample water. The sample water was collected in a sterile container made of synthetic resin and allowed to stand for a predetermined time $t_s$. After the sample water stood for the predetermined time (elapsed time $t_s$=1 min until the seeds were immersed), 15 mL of the sample water was collected in a glass beaker (φ92 mm, height 15 mm), and the seeds were immersed in the sample water.

TABLE 8

CBPTW Production Conditions

| Solvent | Type | Ion-Exchanged Water | |
|---|---|---|---|
| | Mass | 260 | g |
| | Initial pH | 6 | |
| | Initial Conductivity | 1 | μS/cm |
| | Initial Water Temperature | 30 | ° C. |
| Dispersion Device | Number of Revolutions | 7200 | rpm |
| Power Supply | Voltage Peak Value | 10 | kV |
| | Pulth Width | 1.0 | μs |
| | Repetition Frequency | 200 | kHz |
| | Polarity | Bipolar | |
| Electrode | Material | W | |
| | Diameter | 2.0 | mm |
| | Gap Length | 1.0 | mm |
| | Processing Time $t_p$ | 1-30 | min |

TABLE 9

Germination Conditions

| Container | Type | Petri Dish | |
|---|---|---|---|
| | Dimension | φ92 mm × Height 15 mm | |
| | Material | Ordinary Glass | |
| Environment | Temperature | 25 ± 2° C. | |
| | Humidity | 30 ± 20% | |
| Water Supply | Type | Ion-Exchanged Water (DIW) | CBPTW |
| | Processing Time | | 1-30 min |
| | Storage time | | 1 min |
| | Amount | 15 mL | |
| Seed | Number of Pieces | 100 Pieces | |

The results of the seed germination tests as shown in FIGS. 14 to 17 (the relationship between the operating time (the processing time $t_p$) of the device for producing the seed germination promoting liquid and the germination rate and growth degree (leaf area) of the seedling, in which the growth test was conducted by the method of FIG. 6), revealed the following.

Compared to purified water (ion-exchanged water) (DIW), the CBP-processed water (CBPTW) improved the germination rate (germination promoting rate). As can be seen from the result of germination rate after 24 h, the germination rate (germination promoting rate) reached its peak especially around the processing time $t_p$=5 min. From this, it is said that the processing time $t_p$ of about 3 to 10 min, mainly 5 min, is preferable.

The test results about the growth degree of seedlings (leaf area) also showed the same tendency (the growth degree of seedlings also increased as the germination of seeds were promoted). It is said that the processing time $t_p$ of about 3 to 10 min, mainly 5 min, is preferable.

The seed germination promoting liquid and seed germination promoting method using the same according to the present invention have been described above based on the embodiments, but the present invention is not limited thereto. Various changes can be made to their configurations as appropriate without departing from the gist of the present invention.

INDUSTRIAL APPLICABILITY

In the seed germination promoting liquid and seed germination promoting method using the same of the present invention, the processing of water as the raw material can produce the reactive oxygen species, which are thought to be components contained in the seed germination promoting liquid and to exhibit the effect of promoting seed germination. Thereafter, the reactive oxygen species can be finally transformed to the original water. Thus, the seed germination promoting liquid and method of the present invention are very reliable and safe and have no restrictions on approaches or targets to be applied. For example, they can be widely used for germination promotion of a variety of seeds of the following plants: sprouts such as broccoli sprout, mustard sprout, cress, red cabbage sprout, mung bean, black mappe, soybean, alfalfa, and bean sprout; baby leaves such as mizuna, endive, green mustard, tarsai, beet ruby queen, green romaine, red romaine, trevis, red oak, red salad, lollo rossa, red mustard, spinach, iceberg lettuce, red kale, lollo green, rucola rocket, and pinot green; and the like.

DESCRIPTION OF REFERENCE NUMERALS

1 tank
2 stirrer
21 casing
22 rotor
23 motor
3 plasma generation mechanism
31 electrode
32 pulse power supply
4 conduit line

The invention claimed is:

1. A seed germination promoting liquid comprising water containing reactive oxygen species and a nanoparticle catalyst in a stationary state, the seed germination promoting liquid being produced by causing cavitation in water and generating plasma therein using a plasma generation mechanism in which a pulse voltage is applied across electrodes in the water including air bubbles mainly containing water vapor generated by the cavitation.

2. The seed germination promoting liquid of claim 1, wherein the nanoparticles are made of a component of the electrode.

3. A seed germination promoting method comprising: lubricating a seed using water containing reactive oxygen species and a nanoparticle catalyst in a stationary state, the water having been produced by causing cavitation in water and generating plasma therein using a plasma generation mechanism in which a pulse voltage is applied across electrodes in the water including air bubbles mainly containing water vapor generated by the cavitation.

4. The seed germination promoting method according to claim 3, wherein the water containing the reactive oxygen species and the nanoparticle catalyst in the stationary state is used in an environment where the water is not in contact with organic matter, excluding the seed.

5. The seed germination promoting method according to claim 3, wherein the nanoparticles are made of a component of the electrode.

* * * * *